Patented Dec. 30, 1952

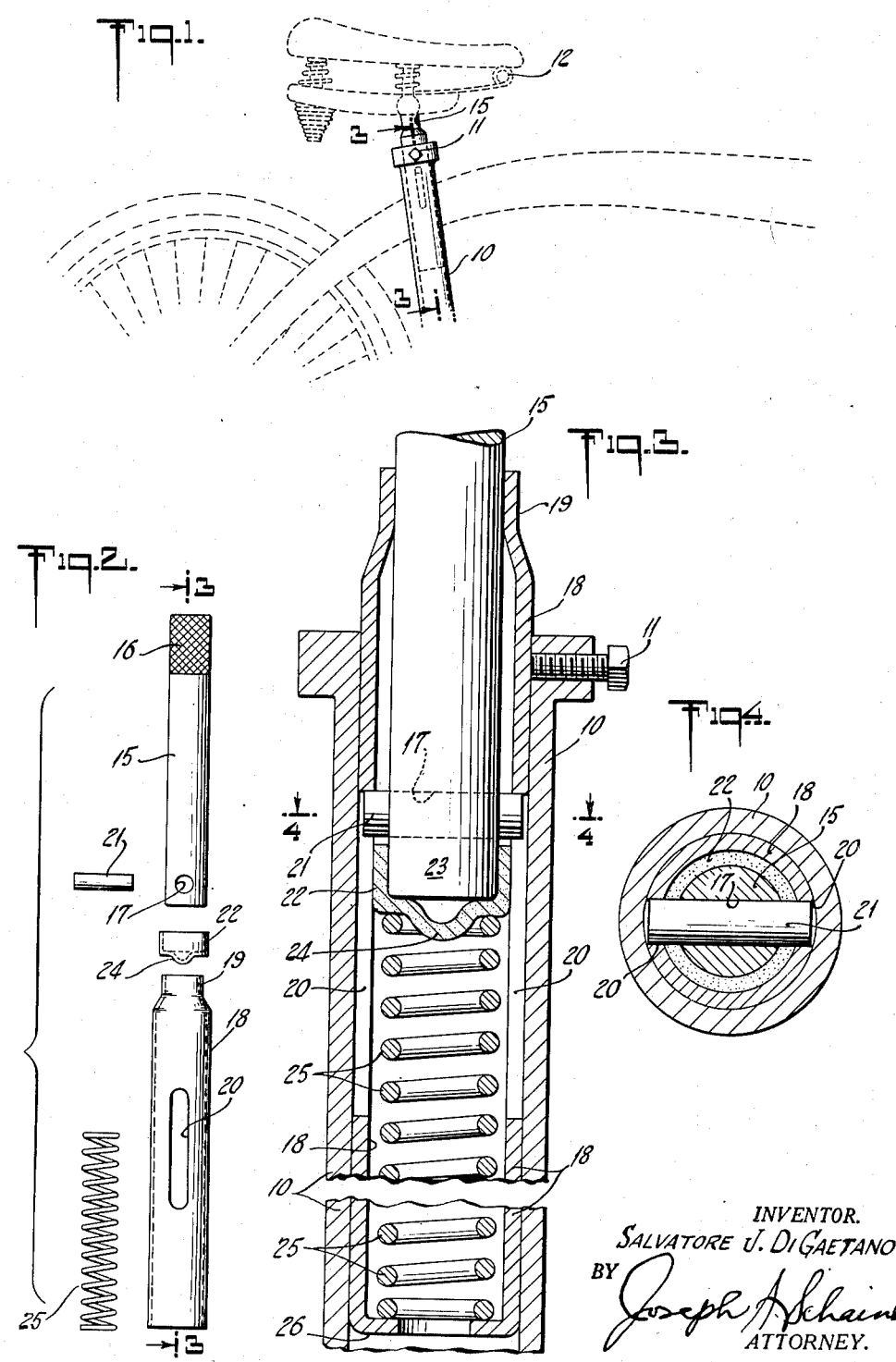

2,623,573

UNITED STATES PATENT OFFICE 2,623,573

SPRING SEAT POST FOR BICYCLES

Salvatore J. Di Gaetano, Maspeth, N. Y.

Application May 26, 1951, Serial No. 228,408

4 Claims. (Cl. 155—5.19)

The present invention relates to spring seat posts for bicycles and is more particularly directed to an accessory suitable for application to bicycles of various makes.

Bicycle frames usually include a tubular seat post mast opening upwardly to receive a seat post and have a clamping device for securing the seat post in an adjusted position. The usual seat post has provisions at the upper end for the attachment of the seat assembly which usually includes the saddle and cushioning springs.

The present invention contemplates a resilient post which may be substituted for the usual rigid post, so as to provide a softer and more comfortable ride. Accordingly, the new seat post includes a tube adapted to be secured in the seat post mast and reciprocably carrying a seat supporting rod and compression spring, and provided with suitable aligning and lubricating means.

Other and further objects will appear as the description proceeds.

The accompanying drawings show, for purposes of illustrating the present invention, an embodiment in which the invention may take form, it being understood that the drawings are illustrative of the invention rather than limiting the same.

In the accompanying drawings:

Figure 1 is a fragmentary side elevational view of a bicycle showing the seat post mast, the seat and the improved seat post;

Figure 2 is an exploded view of the seat post showing the separate parts;

Figure 3 is an enlarged longitudinal section of the seat post mast and seat post taken in the line 3—3 of Figures 1 and 2; and Figure 4 is a cross-section in the line 4—4 of Figure 3.

The tubular seat post mast of a bicycle frame is shown at 10. It carries the usual clamping screw 11. These masts are usually about 7/8" inside diameter. A conventional seat is shown at 12.

The seat post shown in Figures 2, 3 and 4 employs a rod 15 of suitable length and diameter and having its upper end of suitable shape and configuration to fit the particular bicycle seat with which it is to be employed. Simple knurling is shown at 16. Near the lower end the rod is drilled as indicated at 17. The seat post also employs a tubular member 18 having an outside diameter slightly less than the inside diameter of the mast, provided with a constricted upper end 19 and two slots 20, 20 a suitable distance below the upper end.

The tubular member 18, receives the rod 15 after which a pin 21 is passed through the slots 20, 20 and hole 17. A cup-shaped bearing member 22, of the self-lubricating type, such as a metal turning carrying lubricant or an "oilite" bearing, is received by the lower end 23 of the rod 15. This bearing fits the inside diameter of the tube 20, aligns the lower end of the rod 15 and provides lubrication. It has a spring centering projection 24. An expansion spring 25 is received in the tube below the bearing, and while held suitably compressed, is permanently secured in place by inwardly flanging the tube as indicated at 26.

The tube 20 is preferably a length of tubing swaged down to a diameter just small enough to be received in the mast. Its upper end is swaged in, and the lower end flanged in after assembly of the parts. The seat post may be sold as an accessory and readily installed and adjusted to position. When in use, the moving parts are completely protected from dirt and dust.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In a bicycle seat having an elongated tubular seat post mast, a seat supporting shock absorbing seat post, said seat post comprising an elongated tube slidably disposed within the seat post mast and adjustable to various fixed positions with respect thereto, the tube having a constricted upper end, a constricted lower end and two elongated slots opposite one another spaced from the said constricted ends, a seat support in the form of an elongated rod slidably disposed within the upper end of the tube and having a cross pin the ends of which extend into the slots, a cup shaped bearing member secured to the lower end of the rod, and an expansion spring trapped within the tube between the constricted lower end and the bottom of the bearing member, said spring normally urging said bearing and rod upwardly, the cross pin in the rod butting against the upper ends of the slots to limit the extent of upward movement of the rod with respect to the tube in response to normal biasing of the spring.

2. A bicycle seat post such as claimed in claim 1, wherein the cup-shaped bearing is of the self-lubricating type.

3. For use with the elongated tubular seat post mast of a bicycle for resiliently supporting the seat, a seat post comprising a relatively thin-walled tube having a concentric, reduced upper and a concentric reduced lower end, two opposed slots extending lengthwise of the tube between the ends thereof, a round elongated rod fitting in the upper end of the tube and carrying a cross-pin extending into the slots, a cup-shaped, self-lubricating member secured to and depending from the lower end of the rod and fitting the inner wall of the tube, and a helical expansion spring trapped between the lower end of the tube and the cup-shaped member for normally holding the cross-pin against the upper end of the slots in the absence of load on the rod, and yielding to provide a cushioning action when loaded.

4. A bicycle seat support such as claimed in claim 3, wherein the cup-shaped member has a central projection to center the upper end of the spring.

SALVATORE J. DI GAETANO.

REFERENCES CITED

The following references are of record in the file of this patent:

UNITED STATES PATENTS

| Number | Name | Date |
|---|---|---|
| 2,107,561 | Brandt et al. | Feb. 8, 1938 |

FOREIGN PATENTS

| Number | Country | Date |
|---|---|---|
| 29,611 | France | Apr. 25, 1924 |

(1 sheet addition to Patent No. 575,710)